March 19, 1940. E. H. MULCAHY 2,193,935
MACHINE FOR DIE-CASTING BEZELS FOR FRAGILE INSERTS
Filed July 15, 1937 4 Sheets-Sheet 1

Edward H. Mulcahy
INVENTOR.
BY
ATTORNEYS.

March 19, 1940.   E. H. MULCAHY   2,193,935.
MACHINE FOR DIE-CASTING BEZELS FOR FRAGILE INSERTS
Filed July 15, 1937   4 Sheets-Sheet 2

Edward H. Mulcahy
INVENTOR.
BY
ATTORNEYS.

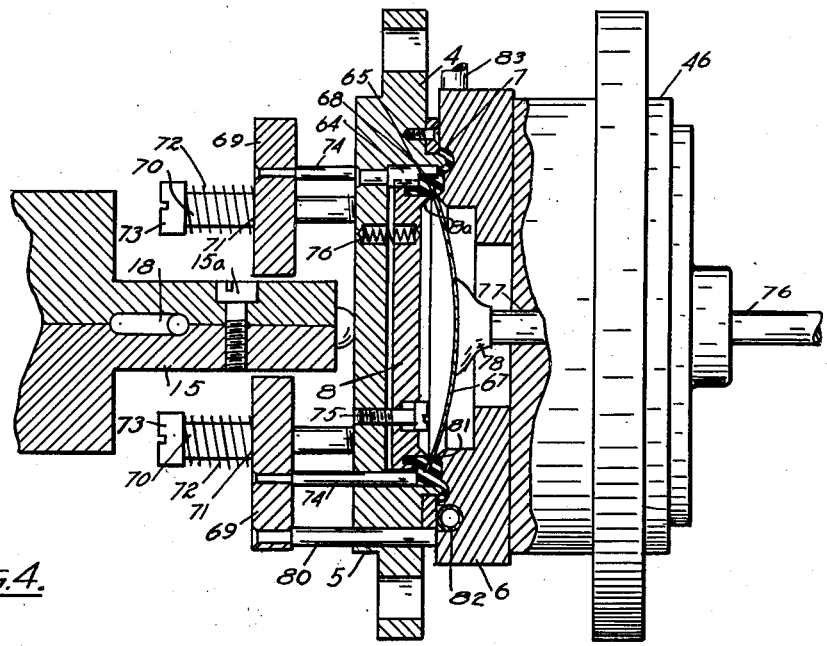
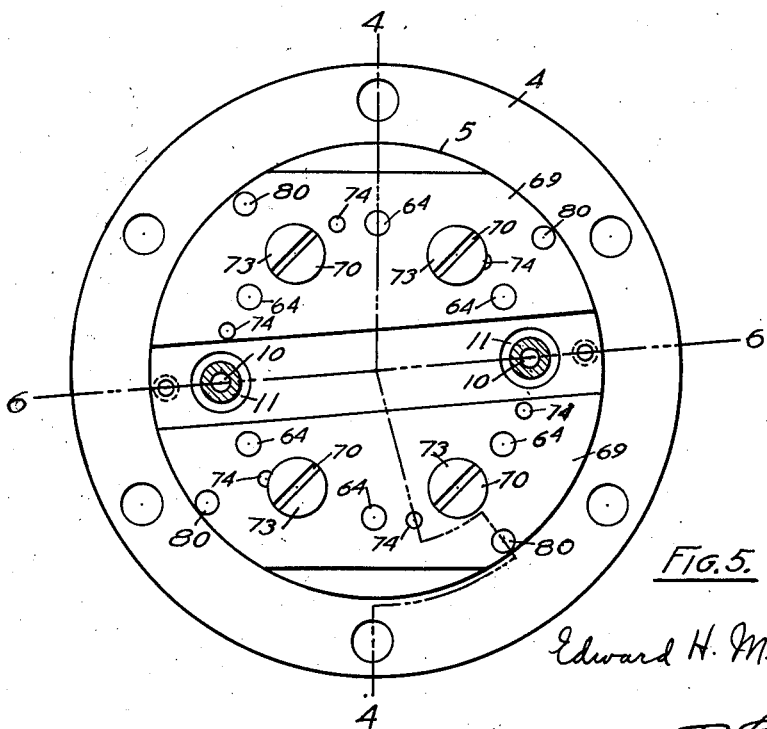

March 19, 1940.　　　E. H. MULCAHY　　　2,193,935

MACHINE FOR DIE-CASTING BEZELS FOR FRAGILE INSERTS

Filed July 15, 1937　　　4 Sheets-Sheet 4

INVENTOR.
Edward H. Mulcahy
BY
ATTORNEYS.

Patented Mar. 19, 1940

2,193,935

UNITED STATES PATENT OFFICE 2,193,935

MACHINE FOR DIE-CASTING BEZELS FOR FRAGILE INSERTS

Edward H. Mulcahy, Erie, Pa., assignor to Erie Resistor Corporation, Erie, Pa., a corporation of Pennsylvania Application July 15, 1937, Serial No. 153,841

7 Claims. (Cl. 18—5)

The present invention is an improvement on the application No. 101,291 filed September 17, 1936, of Leland L. Berry. In the machine referred to, mechanism is provided for making glass articles having surrounding frames sometimes referred to as bezels. In this machine the transparent or glass portion is introduced into the mold and plastic material is forced into the mold filling the mold with a comparatively low pressure flow and then in the final squeeze subjecting the material to a very high pressure, which pressure is built up as the mold fills to a high pressure for the final squeeze. The material used may vary but the invention may be used with a plastic material such as cellulose acetate, one of the commercial variety being tenite.

One of the difficulties encountered in a machine of this class is to complete the molding operation without checking or injuring the glass. I have discovered that if a close fit is provided between the glass and the positioning supports for the glass in the mold a very undesirable percentage of the articles must be rejected because of the slight checking of the glass at these points of contact. I have also discovered that if a very loose fit is made between the edges of the glass and the guide supports for the glass in the mold that undesirable checking takes place, presumably from a violent shifting of the position of the glass during the introduction of the plastic material into the mold. By providing a fit between the edges of the glass and the guides such as will provide flow clearances between the edge of the glass and the positioning surfaces, that is, a clearance which will be large enough to permit the flow of the material into this clearance during the filling of the mold but which clearance does not have a material excess over a flow clearance. With this clearance there is very little, in fact, almost no chipping of the glass in the molding operation. For exemplifying my invention I have used the Berry machine.

A preferred embodiment of the invention is illustrated in the accompanying drawings as follows:

Fig. 4 is an enlarged view similar to Fig. 2 with the dies closed, the section being on the line 4—4 in Fig. 5.

Fig. 5 is a rear elevation of the stationary die.

Figure 1:
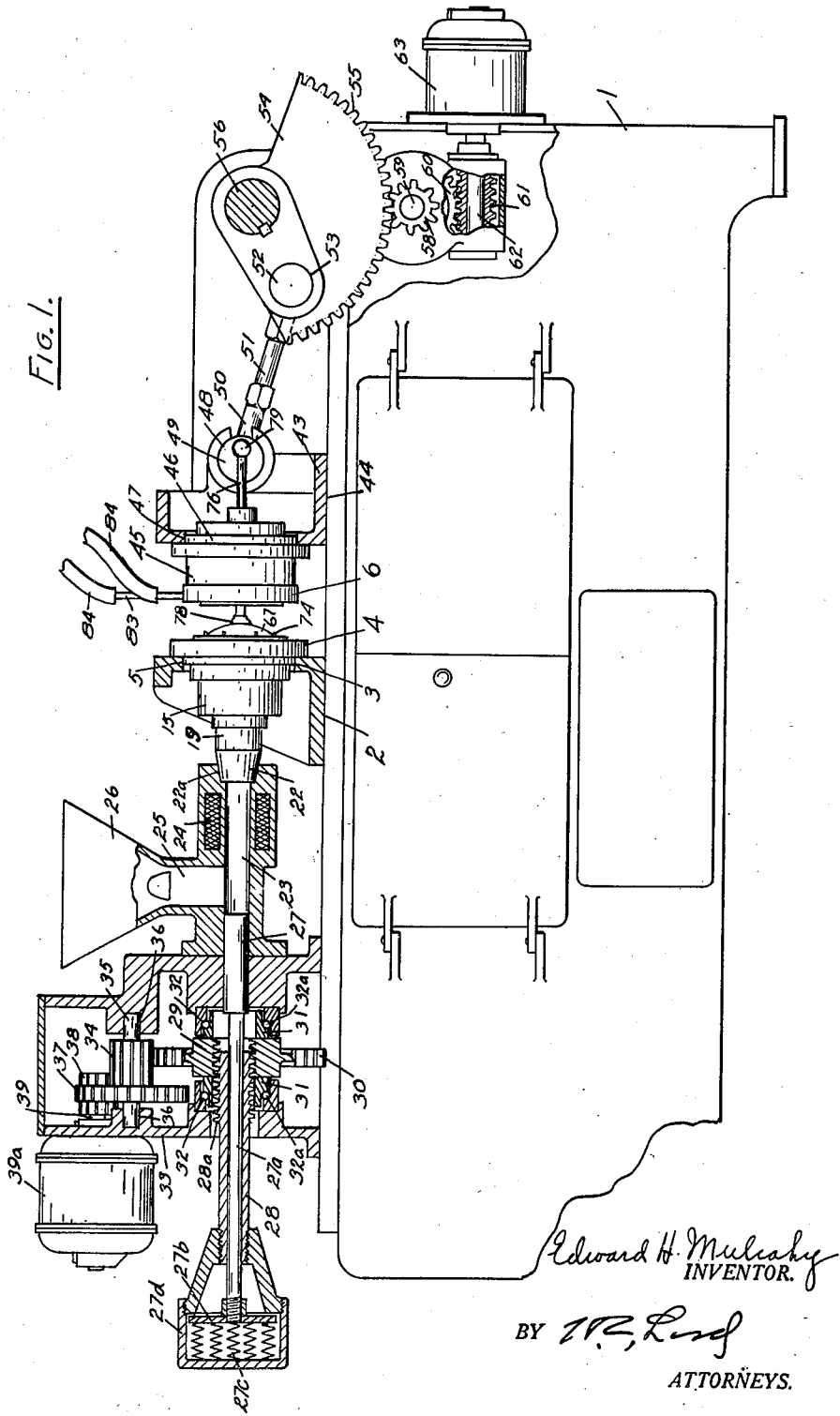
Fig. 1 shows a side elevation of the machine.

1 marks the frame of the machine, 2 a bracket for the stationary die secured to the frame. This bracket has an opening 3 and a stationary die block 4 has an annular shoulder 5 adapted to seat in the opening 3, the die being secured to the bracket by screws (not shown). A movble die block 6 is arranged opposite the stationary block, and a mold cavity 7 is arranged between the block 6 and the mold block 4 and die plate 8.

A plurality of sprue openings 9 are arranged in the die plate 8, as shown two of such openings, and these openings communicate with sprue passages 10 in a nozzle fitting 11 secured in the mold block.

The sprue openings 9 and passages 10 are made of a length to leave a sprue extension 9a on the finished article which forms securing studs for securing the bezel frame 9b on a support, the sprue being separated by the withdrawal of the nozzle in each operation.

The fittings 11 have seats 12 against which seating ends 13 of nozzles 14 seat. The nozzles 14 have passages 16 communicating with passages 17 in a manifold 15. The manifold is made in halves and secured together by screws 15a. The passages 17 are united in a passage 18 which is connected with a passage 20 in a connecting sleeve 19. The passage 20 is spread by a central member 21. The sleeve has a tapered end 22 which extends into a socket 22a at the end of a plunger compression chamber 23. The chamber 23 is surrounded by a heating element 24. A passage 25 extends upwardly from the chamber 23 to a hopper 26 and material is deposited in the hopper in granular form and feeds by gravity to the chamber. With each operation, material is forced through the several passages just described and delivered under die-casting pressure to the mold cavity.

The plunger 27 has an extension 27a with a head 27b. This head engages cushion springs 27c in a case 27d. A sleeve 28 having a screw thread 28a surrounds the shaft 27a and is threaded intermediate its ends and extends through a screw-threaded hub 29 of a gear 30. The gear 30 has a bearing extensions 31 which cooperate with races 32 and form with balls 32a the ball bearing for taking the thrust of the plunger. The races are secured to a gear box 33 mounted on the frame. The gear 30 meshes with a gear 34 which is fixed on a shaft 35. The shaft 35 is mounted in bearings 36 in the gear box. A gear 37 is fixed on the shaft 35 and meshes with a gear 38. The gear 38 is fixed on a rotor shaft 39 of an electric motor 39a. This motor is a reversing motor and is provided with overload switches working automatically to force the plunger forward to a predetermined load when the switch is thrown with proper timing for the holding operation to stop the motor and to reverse the same, and to repeat the cycle, the motor movement being automatically stopped through switches (not shown).

The movable die is mounted on a sliding head 43, slidingly mounted on guides 44 on the top of the frame. The movable die is secured on a mold block 45, this block being provided with an annular shoulder 46 fitting into an opening 47 in the head 43. This mold block is secured by screws (not shown) to the head. The head 43 is provided at each side with bearings 48, and pitman bearing ends 49 are arranged in these bearings. Pitman extensions 50 are formed with the ends 49 and adjustably connected with pitmans 51, it being understood that there are two of these bearings and two of these pitmans, one at each side of the head. The outer ends of the pitmans are secured to a shaft 52 which is journaled in bearings 53 in a body 54 of a gear segment 55. The gear segment is fixed on a shaft 56 with a key 57, and the shaft 56 is journaled in the frame by means of bearings (not shown). The gear segment 55 meshes with a gear 58. The gear 58 is fixed on a shaft 59, and the shaft is journaled in the frame by bearings (not shown). A worm gear 60 is fixed on the shaft 59 and meshes with a worm 61. The worm is fixed with a rotor shaft 62 of an electric motor 63. This electric motor is a reversing motor and is provided with overload switches timed to advance the movable die and retract it in proper time for completing the casting, the reversing of this motor being timed with the plunger rotor so that the continued operation of the machine is automatic.

Positioning pins 64 extend from the mold block into the mold cavity. The pins 64 are notched at 65 forming guide shoulders 66 to hold the fragile insert or cover 67 during the molding operation. A clearance 68 is provided between the edge of the insert or cover 67 and the positioning shoulder 66. This clearance should provide a flow clearance to receive material between the glass and the shoulder. Preferably the ends of the shoulders are slightly curved to assist in the entrance of the material to the clearance space. The flow clearance required will vary somewhat with the viscosity of the material being molded. With tenite the clearance 68 is approximately 1/64 of an inch on a side and the best results are obtained with approximately that clearance. The clearance may be slightly increased up to 3/64, but as it is enlarged from 1/64 less desirable results are obtained, and with the greater clearance the shucking of the glass under the flow of the material chips it. There should be flow clearance that is sufficient considering the viscosity of the material to permit the initial flow of material into this space and so cushion and hold the glass as to prevent destructive pressure contact with the metal of the positioning shoulders during the completion of the filling of the mold.

Pressure plates 69 are slidingly mounted on screws 70 at the back of the die block 4. The screws 70 have stop shoulders 71 and coil springs 72 are arranged around the screws against the pressure plates, said springs being anchored against heads 73 of the screws.

Positioning pins 74 are secured on the pressure plate and extend through the mold block 4 into position to contact and accurately initially position the glass 67 and hold the glass in this position as it is carried into its final position within the guide surfaces 66. The die plate 8 is slidingly mounted on screws 75 and is yieldingly held in its outer position against the heads of the screws by springs 75a. The die plate has a comparatively sharp closing edge 8a which yieldingly engages the inner surface of the glass and the glass is initially positioned on this edge and within the positioning pins 74 by the operator.

Figure 2:
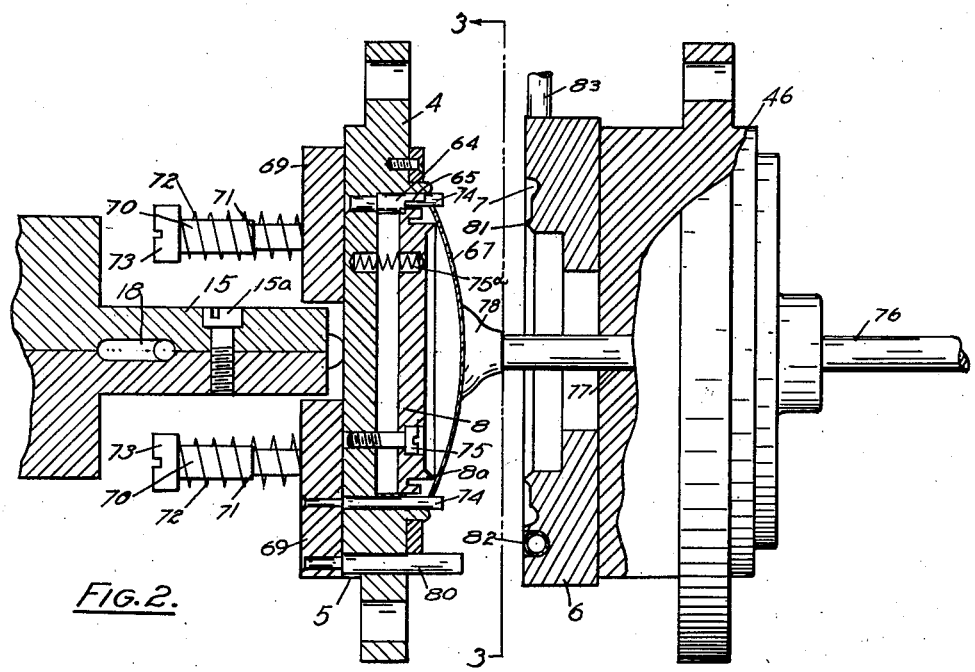
Fig. 2 shows a section of the mold with the dies in open position on the line 2—2 in Fig. 3.
Figure 3:
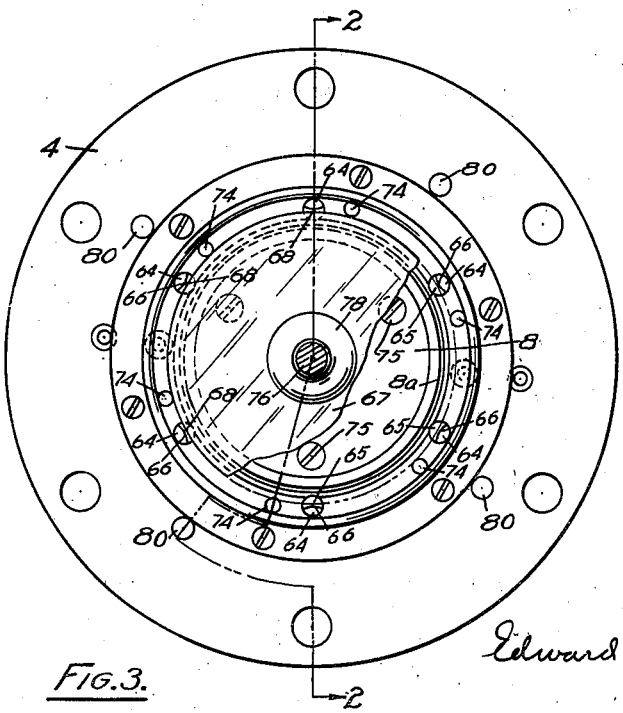
Fig. 3 is a section on the line 3—3 in Fig. 2.
Figure 6:
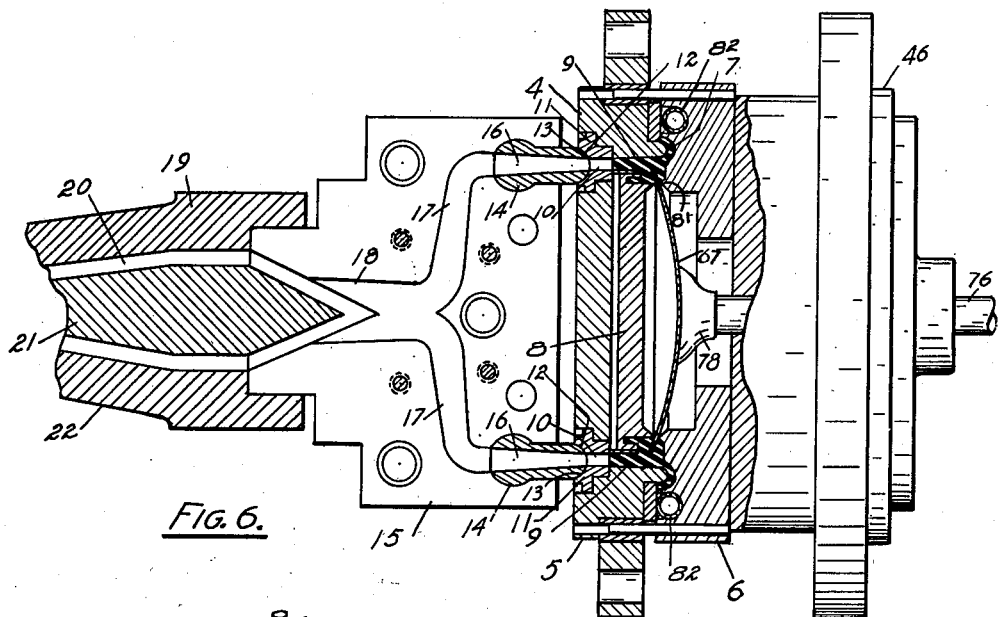
Fig. 6 is a section on the line 6—6 in Fig. 5.
Figures 7, 8:
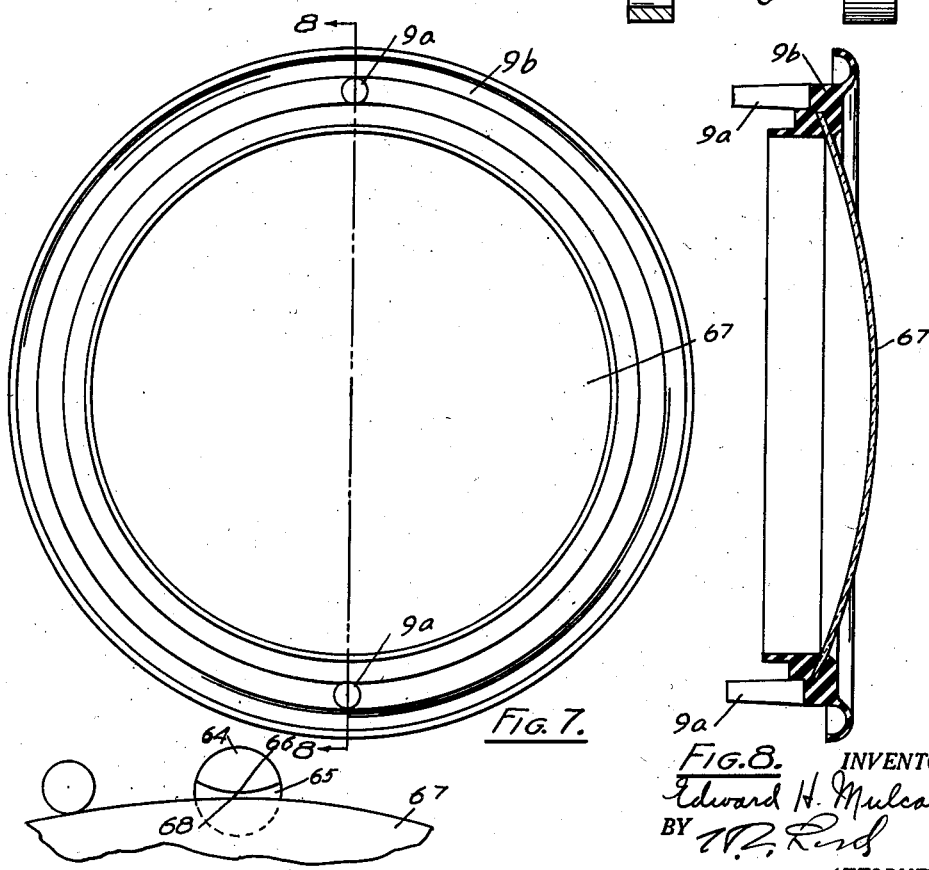
Fig. 7 is a front elevation of the finished article.
Fig. 8 is a section on the line 8—8 in Fig. 7.
Figure 9:
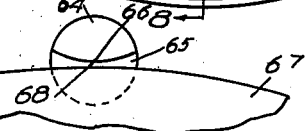
Fig. 9 is an enlarged view showing the glass guiding means.

A pressure bar 76 extends through an opening 77 in the movable mold block. A yielding rubber socket 78 is arranged in the end of the plunger and in position to yieldingly press against the center of the plate, or insert 67 so as to hold it yieldingly against the die plate 8. This bar is provided with a handle, or knob, 79 at its outer end so that it may be readily engaged by the operator and pressed against the insert, or plate, as indicated in dotted lines, Fig. 2.

Push pins 80 are also secured on the pressure plate 69 and extend through the mold block into position to be contacted by the die block 6. The movable mold block at the inner edge of the mold cavity is provided with a comparatively sharp closing edge 81. As the movable mold block closes and the edge 81 engages the glass plate the glass plate is yieldingly held between the edge 8a and the edge 81. As the movable mold block engages the push pins 80 the positioning pins 74 are moved rearwardly. The position established by the positioning pins is maintained by the engagement of the edges 8a and 81 and the insert, or plate, so positioned is carried into the guide surfaces 66. At the completion of the movement the pins 74 are entirely out of the mold cavity. The sharp closing edges 8a and 81 are essential to make a sharp and definite closure of the mold cavity and to prevent an objectionable fin along these edges and where the plate is circumferential these edges engage so little of the circumferential surface as to avoid undue localized strain.

With this structure the die is operated and timed to close, to dwell, to open in proper timing with the plunger which fills the die cavity with each cycle with the plastic material in a viscous state, the heating device being capable of heating the material to the proper consistency. The mold is preferably chilled and this is accomplished by a cooling tube 82 encircling the movable die block, the tube terminating in the ends 83 which are provided with hose connections 84 leading to a source of chilling water supply. By means of this tube, water may be circulated to give the proper cooling temperature. By adding the flow clearance and maintaining clearance approximating this clearance excessive chipping or cracking of the glass is almost entirely avoided.

The positioning pins nicely position the insert, but are carried out of contact so that their contact does not effect breakage of the insert during the molding operation. The clearance afforded between the guiding surfaces 66 and the edge of the insert cushion and support the insert with the edge of the engaging edges 8a and 81 to hold the glass during the filling and pressure build-up of the material in the mold so as to avoid localized strains on the edges and consequent breaking of the glass.

While the annular wall 96 is shown herein of circular form, it will be understood that annular forms other than a circle may be and are commonly used.

What I claim as new is:

1. In a machine of the character described, the combination of a split mold having an annular cavity, the inner periphery of which has an annular slot adapted to be closed by an inserted plate to be included in the finished article; positioning means in the cavity positioned to act on the edge of the plate for positioning the same, and to provide flow clearance between said means and the edge of the plate; and means for forcing plastic material into the mold cavity and subjecting it to pressure therein.

2. In a machine of the character described, the combination of a split mold having an annular cavity, the inner periphery of which has an annular slot adapted to be closed by an inserted plate to be included in the finished article; positioning means in the cavity comprising initial positioning devices provided to contact the edge of the plate; mechanism retracting said devices from the edge of the plate; final positioning means adapted to hold the plate during the filling of the mold; and means for forcing plastic material into the mold cavity and subjecting it to pressure therein.

3. In a machine of the character described, the combination of a split mold having an annular cavity, the inner periphery of which has an annular slot adapted to be closed by an inserted plate to be included in the finished article; positioning means in the cavity comprising initial positioning devices adapted to contact the edge of the plate; mechanism retracting said devices from the edge of the plate; final positioning means adapted to hold the plate during the filling of the mold, said final positioning means providing flow clearance between said final positioning means and the edge of the plate; and means for forcing plastic material into the mold cavity and subjecting it to pressure therein.

4. In a machine of the character described, the combination of a split mold having an annular cavity, the inner periphery of which has an annular slot adapted to be closed by an inserted plate to be included in the finished article, one of the peripheral walls being adapted to yieldingly close on the plate as the mold is closed; positioning means in the cavity comprising initial positioning devices adapted to contact the edges of the plate adapted to initially position the same; mechanism retracting said devices from the edge of the plate after a closure of the peripheral wall of the mold on the plate; and means for forcing plastic material into the mold cavity and subjecting it to pressure therein.

5. In a machine of the character described, the combination of a split mold having an annular cavity, the inner periphery of which has an annular slot adapted to be closed by an inserted plate to be included in the finished article, one of the peripheral walls being adapted to yieldingly close on the plate as the mold is closed; positioning means in the cavity comprising initial positioning devices adapted to contact the edges of the plate adapted to initially position the same; mechanism retracting said devices from the edge of the plate after a closure of the peripheral wall of the mold on the plate; final positioning means adapted to hold the plate and to provide flow clearance between said means and the edge of the plate during the filling of the mold; and means forcing plastic material into the mold cavity and subjecting it to pressure therein.

6. In a machine of the character described, the combination of a split mold having an annular cavity, the inner periphery of which has an annular slot adapted to be closed by an inserted plate to be included in the finished article; two sets of positioning pins adapted to position the plate in the cavity, the first set in close engagement with the plate initially and second set of pins providing flow clearance between said pins and the edge of the plate during the filling action; means for retracting the first set of pins from the edge of the plate; and means forcing plastic material int the mold cavity and subjecting it to pressure therein.

7. In a machine of the character described, the combination of a split mold having an annular cavity, the inner periphery of wnch has an annular slot adapted to be closed by an inserted plate to be included in the finished article, one of the peripheral walls of the mold adapted to yieldingly close on the plate; two sets of positioning pins adapted to position the plate in the cavity, the first set in close engagement with the plate initially and second set of pins providing flow clearance between said pins and the edge of the plate during the filling action; means for retracting the first set of pins after the closing of the yielding annular wall on the plate; and means for forcing plastic material into the mold cavity and subjecting it to pressure therein.

E. H. MULCAHY.